(12) United States Patent
Howcroft et al.

(10) Patent No.: US 9,918,125 B2
(45) Date of Patent: *Mar. 13, 2018

(54) REMOTE VIEWING OF MULTIMEDIA CONTENT

(71) Applicant: AT&T INTELLECTUAL PROPERTY I, LP, Atlanta, GA (US)

(72) Inventors: Jerald Robert Howcroft, Beverly Hills, MI (US); Michael Raftelis, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 105 days.

This patent is subject to a terminal disclaimer.

(21) Appl. No.: 15/160,156

(22) Filed: May 20, 2016

(65) Prior Publication Data
US 2016/0269776 A1 Sep. 15, 2016

Related U.S. Application Data

(63) Continuation of application No. 14/048,619, filed on Oct. 8, 2013, now Pat. No. 9,374,627, which is a continuation of application No. 12/574,439, filed on Oct. 6, 2009, now Pat. No. 8,555,406.

(51) Int. Cl.
| | | |
|---|---|---|
| *H04L 29/06* | (2006.01) | |
| *H04N 21/4402* | (2011.01) | |
| *G06F 21/10* | (2013.01) | |
| *H04N 21/41* | (2011.01) | |
| *H04N 21/414* | (2011.01) | |
| *H04N 21/436* | (2011.01) | |
| *H04N 21/4627* | (2011.01) | |
| *H04N 21/647* | (2011.01) | |

(52) U.S. Cl.
CPC ..... *H04N 21/440236* (2013.01); *G06F 21/10* (2013.01); *H04N 21/4126* (2013.01); *H04N 21/41407* (2013.01); *H04N 21/43615* (2013.01); *H04N 21/4627* (2013.01); *H04N 21/64707* (2013.01)

(58) Field of Classification Search
CPC ............................ G06F 21/10; G06F 21/121
See application file for complete search history.

(56) References Cited

U.S. PATENT DOCUMENTS

| | | | |
|---|---|---|---|
| 4,150,285 A | 4/1979 | Brienza et al. | |
| 5,089,885 A | 2/1992 | Clark | |
| 5,187,571 A | 2/1993 | Braun et al. | |
| 5,227,898 A | 7/1993 | Iavecchia et al. | |

(Continued)

*Primary Examiner* — Izunna Okeke
*Assistant Examiner* — Hee Song
(74) *Attorney, Agent, or Firm* — Guntin & Gust, PLC; David L. Terrell

(57) ABSTRACT

A method and system for remote viewing of multimedia content using a multimedia content distribution network (MCDN) is configured to duplicate multimedia content displayed on a first MCDN terminal device and route the duplicate multimedia content to a second MCDN terminal device. The MCDN terminal devices may be coupled to a local network at an MCDN client premises. The MCDN terminal devices may also include wireless telephony devices for mobile remote viewing functionality. The method may include transcoding of the multimedia content into a format suitable for the second MCDN terminal device.

20 Claims, 9 Drawing Sheets

(56) References Cited

U.S. PATENT DOCUMENTS

| | | |
|---|---|---|
| 5,584,796 A | 12/1996 | Cohen |
| 5,606,458 A | 2/1997 | Fergason |
| 5,613,051 A | 3/1997 | Iodice et al. |
| 5,778,372 A | 7/1998 | Cordell et al. |
| 5,821,927 A | 10/1998 | Gong |
| 5,864,772 A | 1/1999 | Craievich et al. |
| 6,101,445 A | 8/2000 | Craievich et al. |
| 6,147,805 A | 11/2000 | Fergason |
| 6,167,394 A | 12/2000 | Leung et al. |
| 6,331,858 B2 | 12/2001 | Fisher et al. |
| 6,710,790 B1 | 3/2004 | Fagioli et al. |
| 6,862,741 B1 | 3/2005 | Grooters |
| 6,894,809 B2 | 5/2005 | Nims et al. |
| 7,286,955 B1 | 10/2007 | Landry et al. |
| 7,518,620 B2 | 4/2009 | Faraj et al. |
| 7,603,458 B1 | 10/2009 | Sexton et al. |
| 7,647,527 B2 | 1/2010 | Duan et al. |
| 7,725,912 B2 | 5/2010 | Margulis et al. |
| 7,791,559 B2 | 9/2010 | Piasecki et al. |
| 7,884,855 B2 | 2/2011 | Ortiz et al. |
| 7,925,391 B2 | 4/2011 | Sanders-Reed et al. |
| 8,364,778 B2 | 1/2013 | Palase et al. |
| 2002/0147847 A1 | 10/2002 | Brewster et al. |
| 2003/0142038 A1 | 7/2003 | Folk, II et al. |
| 2003/0164962 A1 | 9/2003 | Nims et al. |
| 2004/0187027 A1* | 9/2004 | Chan .............. G06F 21/10 705/51 |
| 2004/0268364 A1 | 12/2004 | Faraj et al. |
| 2006/0053048 A1 | 3/2006 | Tandetnik et al. |
| 2006/0161635 A1 | 7/2006 | Lamkin et al. |
| 2006/0196098 A1 | 9/2006 | Lee et al. |
| 2006/0202925 A1 | 9/2006 | Manning et al. |
| 2006/0276974 A1 | 12/2006 | Zeineh et al. |
| 2007/0070185 A1 | 3/2007 | Dy et al. |
| 2007/0164980 A1 | 7/2007 | Manning et al. |
| 2007/0174710 A1 | 7/2007 | Duan et al. |
| 2007/0195079 A1 | 8/2007 | Boudewyns et al. |
| 2008/0068289 A1 | 3/2008 | Piasecki et al. |
| 2008/0068290 A1 | 3/2008 | Muklashy et al. |
| 2008/0115073 A1 | 5/2008 | Erickson et al. |
| 2008/0184127 A1 | 7/2008 | Rafey et al. |
| 2009/0040135 A1 | 2/2009 | Piazza et al. |
| 2009/0128631 A1 | 5/2009 | Ortiz et al. |
| 2009/0141130 A1 | 6/2009 | Ortiz et al. |
| 2009/0207167 A1 | 8/2009 | Pasetto et al. |
| 2010/0017047 A1 | 1/2010 | Sanders-Reed et al. |
| 2010/0031282 A1 | 2/2010 | Torimaru et al. |
| 2010/0060741 A1 | 3/2010 | Allard et al. |
| 2010/0104021 A1 | 4/2010 | Schmit et al. |
| 2010/0153410 A1 | 6/2010 | Jin et al. |
| 2010/0161818 A1 | 6/2010 | Capuozzo et al. |
| 2011/0019005 A1 | 1/2011 | Ramos et al. |
| 2011/0099481 A1 | 4/2011 | Bitonti et al. |
| 2011/0187563 A1 | 8/2011 | Sanders-Reed et al. |
| 2011/0187846 A1 | 8/2011 | Zeineh et al. |
| 2011/0197237 A1 | 8/2011 | Turner et al. |

* cited by examiner

REMOTE VIEWING OF MULTIMEDIA CONTENT

CROSS-REFERENCE TO RELATED APPLICATIONS

This application is a continuation of and claims priority to U.S. patent application Ser. No. 14/048,619 filed Oct. 8, 2013, which is a continuation of and claims priority to U.S. patent application Ser. No. 12/574,439 filed Oct. 6, 2009 (now U.S. Pat. No. 8,555,406). The contents of each of the foregoing is/are hereby incorporated by reference into this application as if set forth herein in full.

FIELD OF THE DISCLOSURE

The present disclosure relates to remote viewing of multimedia content and, more particularly, to remote viewing using a multimedia content distribution network (MCDN).

DESCRIPTION OF THE RELATED ART

Various terminal devices, including wireless and mobile devices, may be coupled to MCDN customer premises equipment (CPE) to receive and view multimedia content over an MCDN. The ability to transfer multimedia content between MCDN terminal devices may entail cumbersome integration of external equipment and may only provide restrictive remote viewing capability.

DETAILED DESCRIPTION OF THE DRAWINGS

Figure 1:
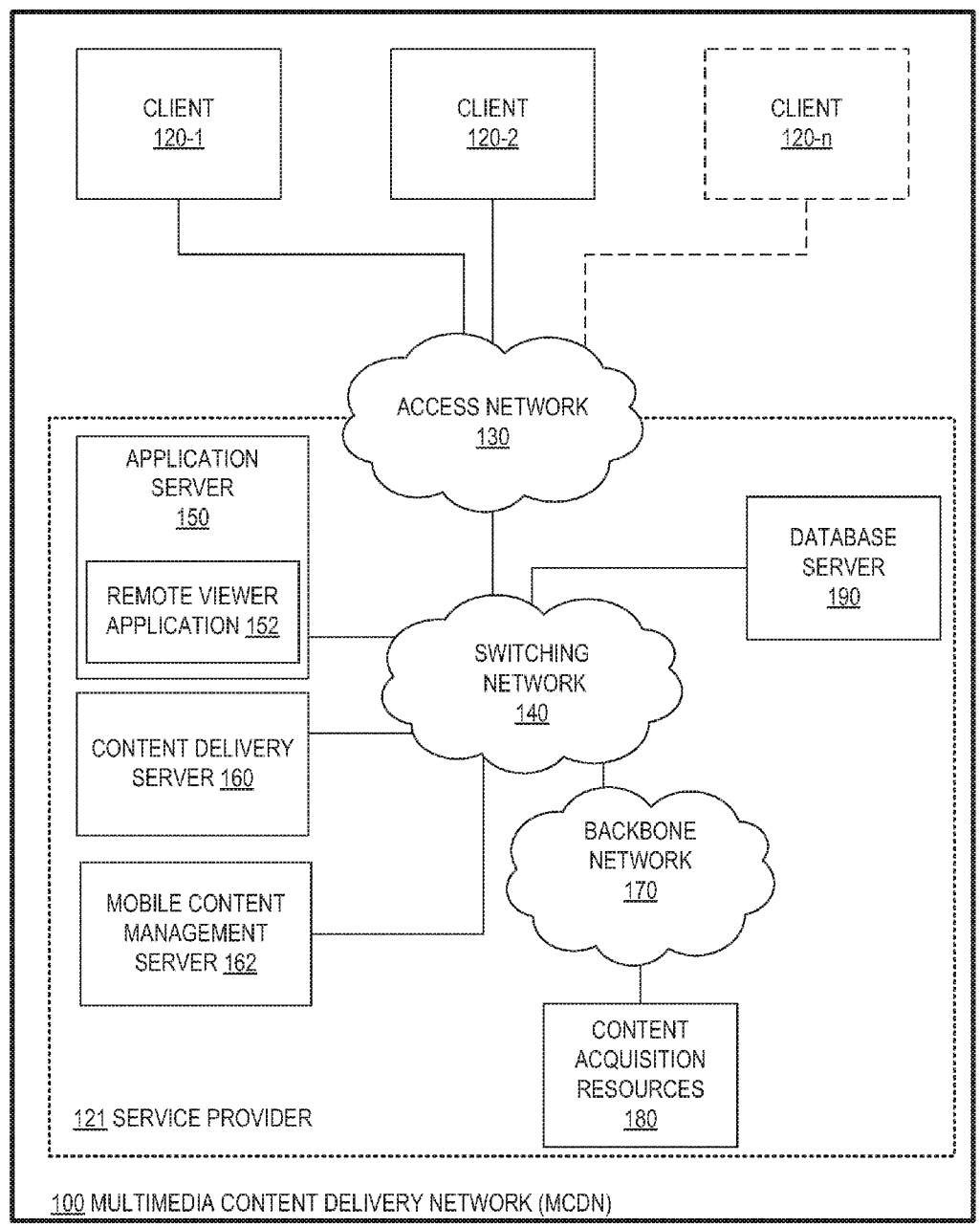
FIG. 1 is a block diagram of selected elements of an embodiment of a multimedia distribution network.

In one aspect, a disclosed method for a user to remotely view multimedia content received over an MCDN includes transmitting first multimedia content from an MCDN service provider to a first MCDN terminal device configured to display the first multimedia content. In response to a user request for remote viewing of the first MCDN terminal device display, the method may further include duplicating the first multimedia content displayed on the first MCDN terminal device, the duplicate multimedia content including the first multimedia content, for transmission to a second MCDN terminal device. The method operation of duplicating may further include transcoding the duplicate multimedia content into a format suitable for the second MCDN terminal device. The method operation of duplicating may still further include obtaining digital-rights management (DRM) authorization to perform said duplicating.

In some instances, the method further includes transmitting the duplicate multimedia content to the second MCDN terminal device. The duplicate multimedia content may be transmitted to a terminal service executing on the second MCDN terminal device. The first MCDN terminal device and the second MCDN terminal device may be selected from the following device types: a television, a personal computer, a gaming console, and a mobile multimedia device. The first MCDN terminal device and the second MCDN terminal may be of different device types or of the same device type. The mobile multimedia device may be configured for wireless telephony communication, while the method operation of duplicating may further include transmitting the duplicate multimedia content to a mobile content management server that is coupled to a wireless transmission network providing wireless network service to the mobile multimedia device.

In a further aspect, a disclosed CPE for use within a client configuration of an MCDN includes a processor, a network adapter, and memory media accessible to the processor, including instructions executable by the processor. The processor instructions may be executable to receive first multimedia content from an MCDN server via the network adapter, and send the first multimedia content to a first MCDN terminal device coupled to the CPE and configured to display the first multimedia content. The processor instructions may further be executable to duplicate the first multimedia content displayed on the first MCDN terminal device, the duplicate multimedia content including the first multimedia content, and send the duplicate multimedia content to a second MCDN terminal device coupled to the CPE. The first MCDN terminal device and the second MCDN terminal device may be coupled to the CPE via a fixed network.

In some embodiments, the CPE further includes a local wireless network adapter configured to provide wireless access to at least one of the first MCDN terminal device and the second MCDN terminal device. At least one of the first MCDN terminal device and the second MCDN terminal device may be a mobile wireless telephony device configured to display multimedia content.

In certain instances, the processor executable instructions to send the duplicate multimedia content may further comprise processor executable instructions to send the duplicate multimedia content to a mobile content management server coupled to a wireless transmission network providing wireless network service to the mobile wireless telephony device.

In yet another aspect, disclosed computer-readable memory media include executable instructions for remote viewing of multimedia content over an MCDN. The instructions may be executable to receive first multimedia content from an MCDN server, and send the first multimedia content to a first MCDN terminal device configured to display the first multimedia content. The instructions may further be executable to duplicate the first multimedia content, and send the duplicate multimedia content to a second MCDN terminal device.

In certain implementations, the memory media may further include instructions executable to transcode the duplicate multimedia content into a format suitable for the second MCDN terminal device, wherein the first MCDN terminal device and the second MCDN terminal device are different types of devices. The memory media may still further include instructions executable to obtain DRM authorization to duplicate the first multimedia content. The memory media may also include instructions executable to send the duplicate multimedia content to a terminal service executing on the second MCDN terminal device. The memory media may further include instructions executable to receive user input for selecting a terminal service on the first MCDN terminal device or the second MCDN terminal device. The memory media may yet further include instructions executable to receive user input for displaying an indication of transcoding between the first MCDN terminal device and the second MCDN terminal device. The memory media may also further include instructions executable to receive user input for displaying an indication of DRM for the duplicate multimedia content.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

Turning now to the drawings, FIG. 1 is a block diagram illustrating selected elements of an embodiment of MCDN 100. Although multimedia content is not limited to TV, video on demand (VOD), or pay-per-view (PPV) programs, the depicted embodiments of MCDN 100 and its capabilities are primarily described herein with reference to these types of multimedia content, which are interchangeably referred to herein as "multimedia content", "multimedia content programs", "multimedia programs" or, simply, "programs."

The elements of MCDN 100 illustrated in FIG. 1 depict network embodiments with functionality for delivering multimedia content to a set of one or more subscribers. It is noted that different embodiments of MCDN 100 may include additional elements or systems (not shown in FIG. 1 for clarity) as desired for additional functionality, such as data processing systems for billing, content management, customer support, operational support, or other business applications.

As depicted in FIG. 1, MCDN 100 includes one or more clients 120 and a service provider 121. Each client 120 may represent a different subscriber of MCDN 100. In FIG. 1, a plurality of n clients 120 is depicted as client 120-1, client 120-2 to client 120-n, where n may be a large number. Service provider 121 as depicted in FIG. 1 encompasses resources to acquire, process, and deliver programs to clients 120 via access network 130. Such elements in FIG. 1 of service provider 121 include content acquisition resources 180 connected to switching network 140 via backbone network 170, as well as application server 150, database server 190, mobile content management server 162, and content delivery server 160, also shown connected to switching network 140.

Access network 130 demarcates clients 120 and service provider 121, and provides at least one connection path between clients 120 and service provider 121. In some embodiments, access network 130 is an Internet protocol (IP) compliant network. In some embodiments, access network 130 is, at least in part, a coaxial cable network. It is noted that in some embodiments of MCDN 100, access network 130 is owned and/or operated by service provider 121. In other embodiments, a third party may own and/or operate at least a portion of access network 130.

In IP-compliant embodiments of access network 130, access network 130 may include a physical layer of unshielded twisted pair cables, fiber optic cables, or a combination thereof. MCDN 100 may include digital subscribe line (DSL) compliant twisted pair connections between clients 120 and a node (not depicted) in access network 130 while fiber, cable or another broadband medium connects service provider resources to the node. In other embodiments, the broadband cable may extend all the way to clients 120.

As depicted in FIG. 1, switching network 140 provides connectivity for service provider 121, and may be housed in a central office or other facility of service provider 121. Switching network 140 may provide firewall and routing functions to demarcate access network 130 from the resources of service provider 121. In embodiments that employ DSL compliant connections, switching network 140 may include elements of a DSL Access Multiplexer (DSLAM) that multiplexes many subscriber DSLs to backbone network 170.

In FIG. 1, backbone network 170 represents a private network including, as an example, a fiber based network to accommodate high data transfer rates. Content acquisition resources 180 as depicted in FIG. 1 encompass the acquisition of various types of content including broadcast content, other "live" content including national content feeds, and VOD content.

Thus, the content provided by service provider 121 encompasses multimedia content that is scheduled in advance for viewing by clients 120 via access network 130. Such multimedia content, also referred to herein as "scheduled programming," may be selected using an electronic programming guide (EPG), such as EPG 316 described below with respect to FIG. 3. Accordingly, a user of MCDN 100 may be able to browse scheduled programming well in advance of the broadcast date and time. Some scheduled programs may be "regularly" scheduled programs, which recur at regular intervals or at the same periodic date and time (i.e., daily, weekly, monthly, etc.). Programs which are broadcast at short notice or interrupt scheduled programs are referred to herein as "unscheduled programming."

Acquired content is provided to content delivery server 160 via backbone network 170 and switching network 140. Content may be delivered from content delivery server 160 to clients 120 via switching network 140 and access network 130. Content may be compressed, encrypted, modulated, demodulated, and otherwise encoded or processed at content acquisition resources 180, content delivery server 160, or both. Although FIG. 1 depicts a single element encompassing acquisition of all content, different types of content may be acquired via different types of acquisition resources. Similarly, although FIG. 1 depicts a single content delivery server 160, different types of content may be delivered by different servers. Moreover, embodiments of MCDN 100 may include content acquisition resources in regional offices that are connected to switching network 140.

Although service provider 121 is depicted in FIG. 1 as having switching network 140 to which content acquisition resources 180, content delivery server 160, and application server 150 are connected, other embodiments may employ different switching networks for each of these functional components and may include additional functional components (not depicted in FIG. 1) including, for example, operational subsystem support (OSS) resources.

FIG. 1 also illustrates application server 150 connected to switching network 140. As suggested by its name, application server 150 may host or otherwise implement one or more applications for MCDN 100. Application server 150 may be any data processing system with associated software that provides applications for clients or users. Application server 150 may provide services including multimedia content services, e.g., EPGs, digital video recording (DVR) services, VOD programs, PPV programs, IPTV portals, digital rights management (DRM) servers, navigation/middleware servers, conditional access systems (CAS), and remote diagnostics, as examples.

Applications provided by application server 150 may be downloaded and hosted on other network resources including, for example, content delivery server 160, switching network 140, and/or on clients 120. Application server 150 is configured with a processor and storage media (not shown in FIG. 1) and is enabled to execute processor instructions, such as those included within a software application. As depicted in FIG. 1, application server 150 may be configured to include remote viewer application 152, which, as will be described in detail below, may be configured to enable a user of client 120 of MCDN 100 to remotely view multimedia content.

Further depicted in FIG. 1 is database server 190, which provides hardware and software resources for data warehousing. Database server 190 may communicate with other elements of the resources of service provider 121, such as application server 150 or content delivery server 160, in order to store and provide access to large volumes of data, information, or multimedia content. In some embodiments, database server 190 includes a data warehousing application, accessible via switching network 140, that can be used to record and access structured data, such as program or channel metadata for clients 120. Database server 190 may also store device information, such as identifiers for client 120, and identifiers for various types of MCDN terminal devices.

Figure 2:
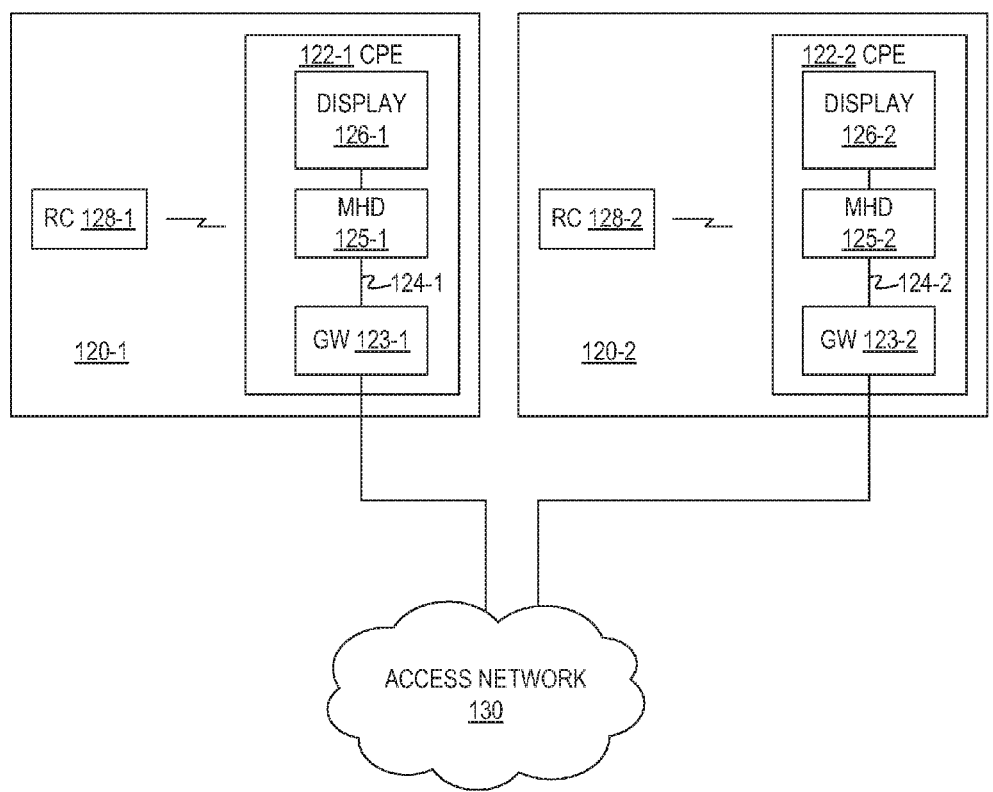
FIG. 2 is a block diagram of selected elements of an embodiment of a multimedia distribution network.

Turning now to FIG. 2, clients 120 are shown in additional detail with respect to access network 130. Clients 120 may include a network appliances collectively referred to herein as CPE 122. In the depicted embodiment, CPE 122 includes the following devices: gateway (GW) 123, multimedia handling device (MHD) 125, and display device 126. Any combination of GW 123, MHD 125, and display device 126 may be integrated into a single physical device. Thus, for example, CPE 122 might include a single physical device that integrates GW 123, MHD 125, and display device 126. As another example, MHD 125 may be integrated into display device 126, while GW 123 is housed within a physically separate device.

In FIG. 2, GW 123 provides connectivity for client 120 to access network 130. GW 123 provides an interface and conversion function between access network 130 and client-side local area network (LAN) 124. GW 123 may include elements of a conventional DSL or cable modem. GW 123, in some embodiments, may further include routing functionality for routing multimedia content, conventional data content, or a combination of both in compliance with IP or another network layer protocol. In some embodiments, LAN 124 may encompass or represent an IEEE 802.3 (Ethernet) LAN, an IEEE 802.11-type (WiFi) LAN, or a combination thereof. GW 123 may still further include WiFi or another type of wireless access point to extend LAN 124 to wireless-capable devices in proximity to GW 123. GW 123 may also provide a firewall (not depicted) between clients 120 and access network 130.

Clients 120 as depicted in FIG. 2 further include a display device or, more simply, a display 126. Display 126 may be implemented as a TV, a liquid crystal display screen, a computer monitor, or the like. Display 126 may comply with a display standard such as National Television System Committee (NTSC), Phase Alternating Line (PAL), or another suitable standard. Display 126 may include one or more integrated speakers to play audio content.

Clients 120 are further shown with their respective remote control (RC) 128, which is configured to control the operation of MHD 125 by means of a user interface (not shown in FIG. 2) displayed on display 126. RC 128 of client 120 is operable to communicate requests or commands wirelessly to MHD 125 using infrared (IR) or radio frequency (RF) signals. MHDs 125 may also receive requests or commands via buttons (not depicted) located on side panels of MHDs 125. In some embodiments, RC 128 may be operable to configure remote viewing of multimedia content, and/or to activate remote viewing of multimedia content, as will be described in detail below.

MHD 125 is enabled and configured to process incoming multimedia signals to produce audio and visual signals suitable for delivery to display 126 and any optional external speakers (not depicted). Incoming multimedia signals received by MHD 125 may be compressed and/or encrypted, digital or analog, packetized for delivery over packet switched embodiments of access network 130 or modulated for delivery over cable-based access networks. In some embodiments, MHD 125 may be implemented as a stand-alone set top box suitable for use in a co-axial or IP-based MCDN.

Figure 3:
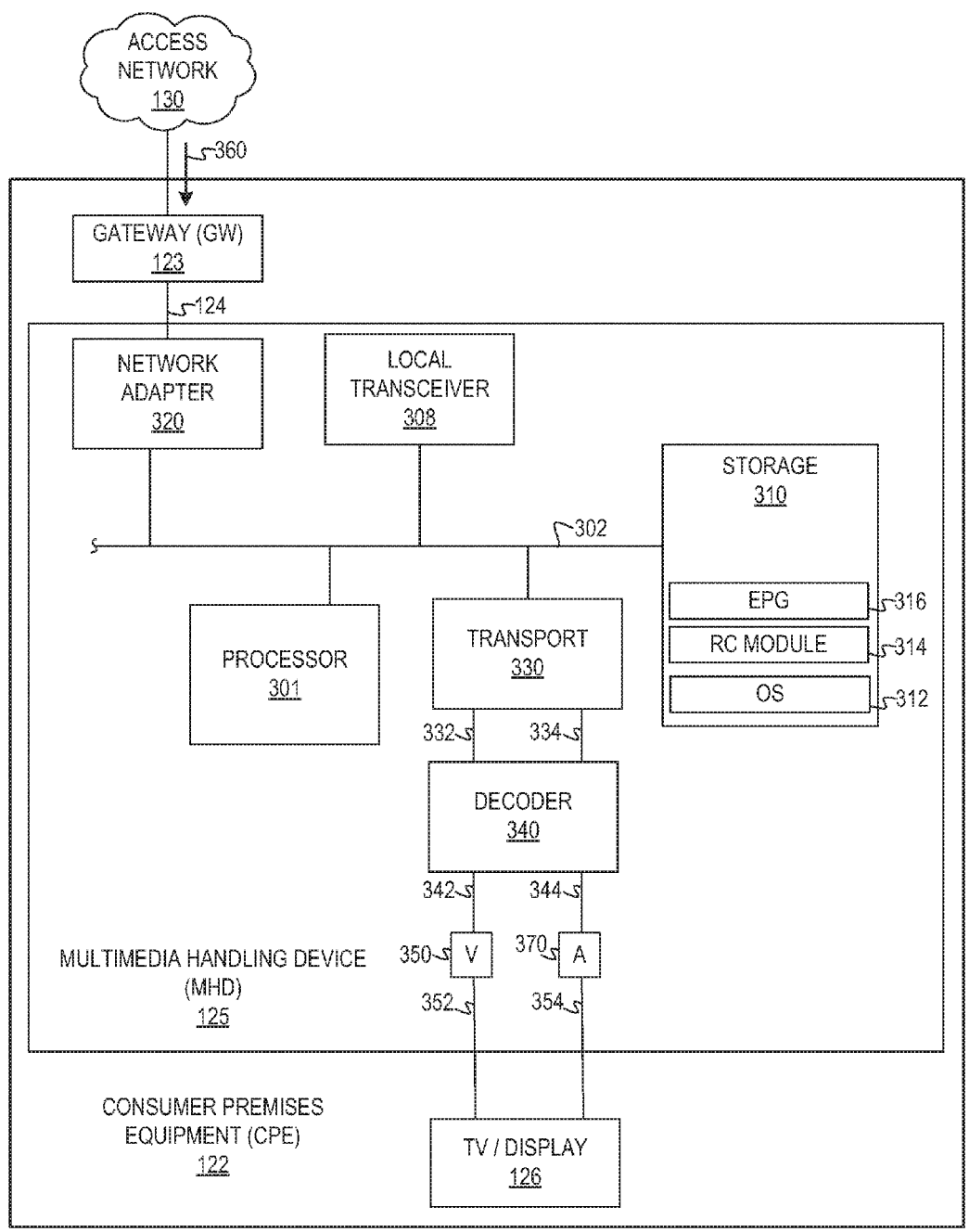
FIG. 3 is a block diagram of selected elements of an embodiment of a multimedia handling device.

Referring now to FIG. 3, a block diagram illustrating selected elements of an embodiment of MHD 125 is presented. In FIG. 3, MHD 125 is shown as a functional component of CPE 122 along with GW 123 and display 126, independent of any physical implementation, as discussed above with respect to FIG. 2. In particular, it is noted that CPE 122 may be any combination of GW 123, MHD 125 and display 126.

In the embodiment depicted in FIG. 3, MHD 125 includes processor 301 coupled via shared bus 302 to storage media collectively identified as storage 310. MHD 125, as depicted in FIG. 3, further includes network adapter 320 that interfaces MHD 125 to LAN 124 and through which MHD 125 receives multimedia content 360. GW 123 is shown providing a bridge between access network 130 and LAN 124, and receiving multimedia content 360 from access network 130.

In embodiments suitable for use in IP based content delivery networks, MHD 125, as depicted in FIG. 3, may include transport unit 330 that assembles the payloads from a sequence or set of network packets into a stream of multimedia content. In coaxial based access networks, content may be delivered as a stream that is not packet based and it may not be necessary in these embodiments to include transport unit 330. In a co-axial implementation, however, clients 120 may require tuning resources (not explicitly depicted in FIG. 3) to "filter" desired content from other content that is delivered over the coaxial medium simultaneously and these tuners may be provided in MHDs 125. The stream of multimedia content received by transport unit 330 may include audio information and video information and transport unit 330 may parse or segregate the two to generate video stream 332 and audio stream 334 as shown.

Video and audio streams 332 and 334, as output from transport unit 330, may include audio or video information that is compressed, encrypted, or both. A decoder unit 340 is shown as receiving video and audio streams 332 and 334 and generating native format video and audio streams 342 and 344. Decoder 340 may employ any of various widely distributed video decoding algorithms including any of the Motion Pictures Expert Group (MPEG) standards, or Windows Media Video (WMV) standards including WMV 9, which has been standardized as Video Codec-1 (VC-1) by the Society of Motion Picture and Television Engineers. Similarly decoder 340 may employ any of various audio decoding algorithms including Dolby® Digital, Digital Theatre System (DTS) Coherent Acoustics, and Windows Media Audio (WMA).

The native format video and audio streams 342 and 344 as shown in FIG. 3 may be processed by encoders/digital-to-analog converters (encoders/DACs) 350 and 370 respectively to produce analog video and audio signals 352 and 354 in a format compliant with display 126, which itself may not be a part of MHD 125. Display 126 may comply with NTSC, PAL or any other suitable television standard.

Storage 310 encompasses persistent and volatile media, fixed and removable media, and magnetic and semiconductor media. Storage 310 is operable to store instructions, data, or both. Storage 310 as shown may include sets or sequences of instructions, namely, an operating system 312, a remote control application program identified as RC module 314, and EPG 316. Operating system 312 may be a UNIX or UNIX-like operating system, a Windows® family operating system, or another suitable operating system. In some embodiments, storage 310 is configured to store and execute instructions provided as services to client 120 by application server 150, as mentioned previously.

EPG 316 represents a guide to the multimedia content provided to client 120 via MCDN 100, and may be shown to the user as an element of the user interface. The user interface may include a plurality of menu items arranged according to one or more menu layouts, which enable a user to operate MHD 125. The user may operate the user interface, including EPG 316, using RC 128 (see FIG. 2) in conjunction with RC module 314. In some embodiments, remote viewing application 152, in conjunction with EPG 316, provides functionality for remote viewing of multimedia content on MCDN terminal devices, as will now be described in further detail below.

Local transceiver 308 represents an interface of MHD 125 for communicating with external devices, such as RC 128, or another device. Local transceiver 308 may provide a mechanical interface for coupling to an external device, such as a plug, socket, or other proximal adapter. In some cases, local transceiver 308 may be a wireless transceiver, configured to send and receive IR or RF or other signals. Local transceiver 308 may be accessed by RC module 314 for providing RC functionality.

Figure 4:
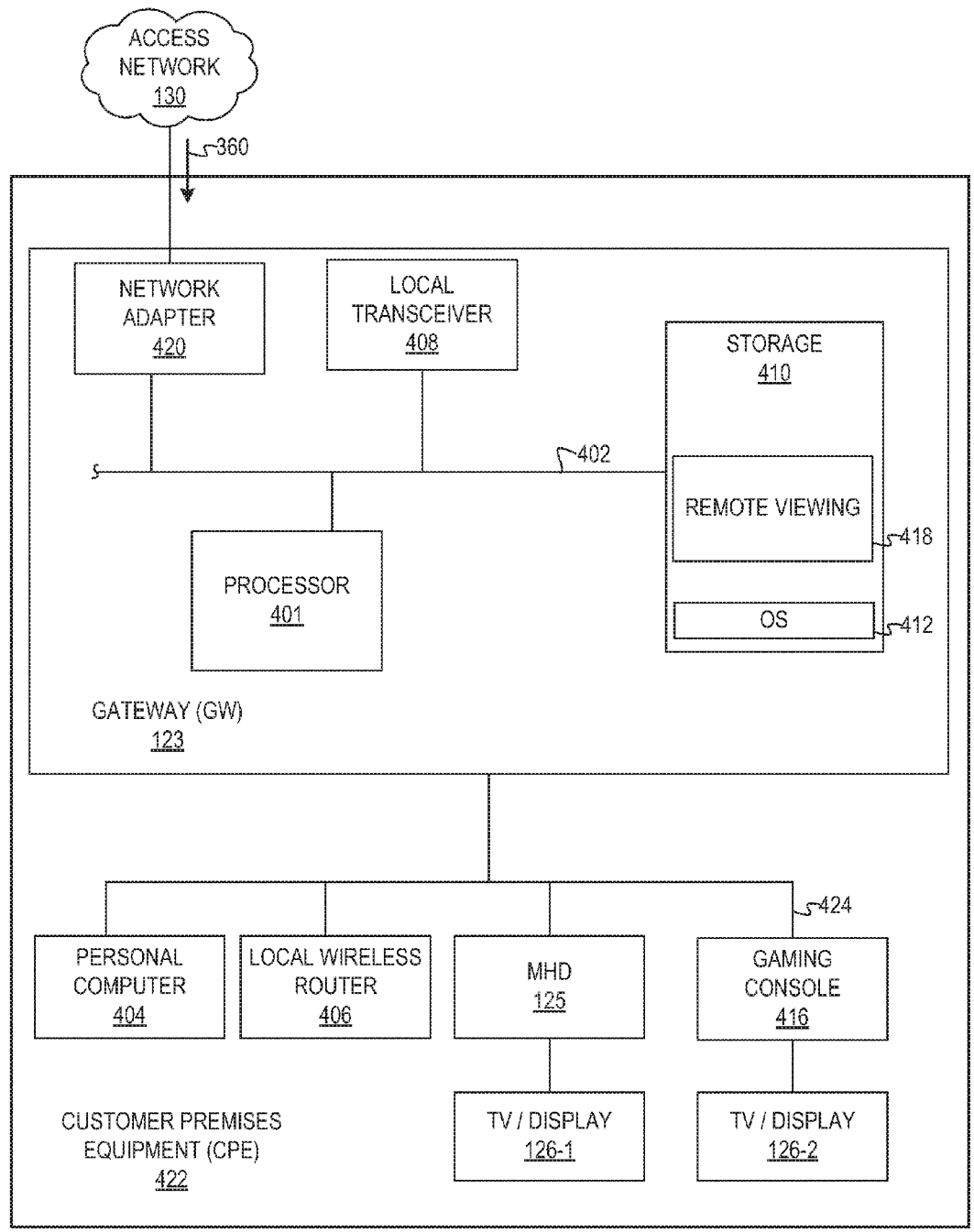
FIG. 4 is a block diagram of selected elements of an embodiment of a multimedia distribution network device.

Turning now to FIG. 4, one embodiment of CPE 422, including selected elements of a detailed embodiment of GW 123, is shown. In FIG. 4, GW 123 is shown as a functional component of CPE 422 along with personal computer 404, local wireless router 406, MHD 125, displays 126-1 and 126-2, and gaming console 416. It is noted that CPE 422 may represent an embodiment of CPE 122 (see FIGS. 2-3). The elements depicted in CPE 422 may be arranged independent of any physical implementation, as discussed above with respect to FIGS. 2-3. In particular, it is noted that CPE 422 may be embodied as any physical or mechanical combination of GW 123, MHD 125 and display 126, or other elements. It is noted that like numbered elements depicted in FIG. 4 represent identical elements in FIGS. 1-3.

In the embodiment depicted in FIG. 4, GW 123 includes processor 401 coupled via shared bus 402 to storage media collectively identified as storage 410. GW 123, as depicted in FIG. 4, further includes network adapter 420 that interfaces GW 123 to access network 130 and through which GW 123 receives multimedia content 360. GW 123 is further shown coupled to LAN 424, which provides connectivity to other devices included with CPE 422, as will be discussed in further detail below. GW 123 may serve as a bridge between access network 130 and LAN 424, while receiving multimedia content 360 from access network 130.

Storage 410 encompasses persistent and volatile media, fixed and removable media, and magnetic and semiconductor media. Storage 410 is operable to store instructions, data, or both. Storage 410 as shown may include sets or sequences of instructions, namely, an operating system 412, and remote viewing 418. Operating system 412 may be a UNIX or UNIX-like operating system, a Windows® family operating system, or another suitable operating system. In some embodiments, storage 410 is configured to store and execute instructions provided as services to client 120 by application server 150, as mentioned previously. Remote viewing 418 may be configured to provide remote viewing to a user of CPE 422 and may operate in conjunction with EPG 316 (see FIG. 3).

Local transceiver 408 represents an interface of GW 123 for communicating with external devices, such as RC 128, or another device. Local transceiver 408 may provide a mechanical interface for coupling to an external device, such as a plug, socket, or other proximal adapter. In some cases, local transceiver 408 may be a wireless transceiver, configured to send and receive IR or RF or other signals.

LAN 424 may represent a fixed network, a wireless network, or a combination thereof. LAN 424 may represent an exemplary embodiment of LAN 124 (see FIGS. 2-3). In certain embodiments, local transceiver 408 and/or network adapter 420 may provide connectivity for and/or be in communication with LAN 424. LAN 424 may provide network services for interconnecting a number of devices, which may be located at a premises of an MCDN customer. As shown in CPE 422, an exemplary implementation of LAN 424 provides network connectivity for a number of different types of MCDN terminal devices, such as personal computer 404, local wireless router 406, MHD 125, and gaming console 416.

Personal computer 404 may represent at least one personal computer coupled to GW 123 for the purpose of obtaining wide-area network access via access network 130. In one embodiment, personal computer 404 is provided network access to the Internet with an MCDN account using service provider 121 (see FIG. 1). Local wireless router 406 may serve as a bridge to a wireless network segment at the premises where CPE 422 is located, and may include wireless networking components to establish the wireless network segment. Local wireless router 406 may provide connectivity to LAN 424 for various types of devices, such as, but not limited to, wireless communications devices, imaging devices, cameras, portable media players, and personal computers. MHD 125 and TV/display 126-1 may represent an embodiment of a television device, such as an IPTV device (see FIGS. 2-3). Gaming console 416 may represent a system for playing multimedia games and may be coupled to TV/display 126-2. In certain embodiments, gaming console 416 may share TV/display 126-1 with MHD 125 (not shown in FIG. 4).

Figure 5:
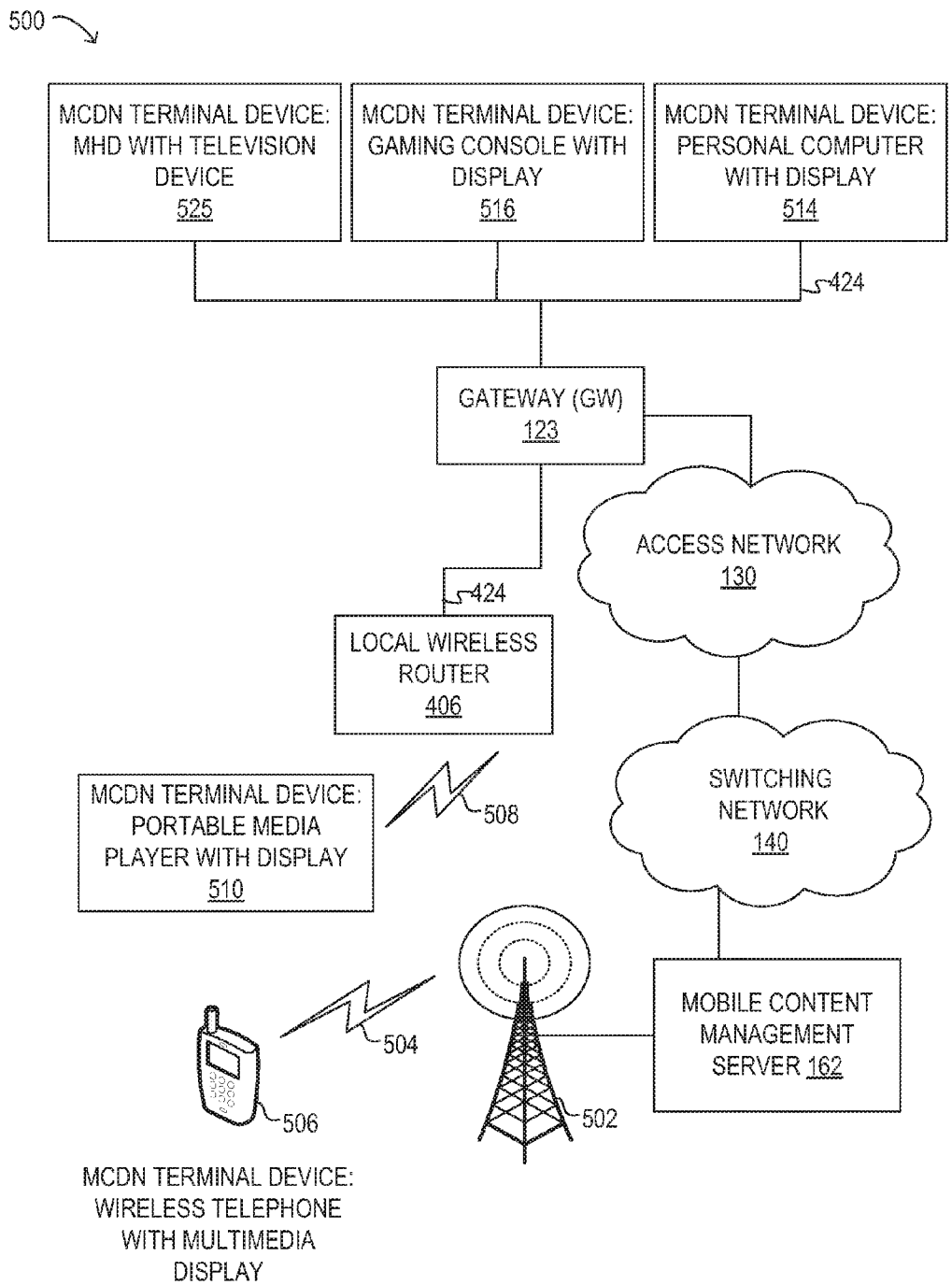
FIG. 5 is a block diagram of selected elements of an embodiment of a multimedia distribution network.

Referring now to FIG. 5, a block diagram illustrating selected elements of an embodiment of MCDN system 500 is presented. MCDN system 500 is shown with selected elements for providing remote viewing functionality. It is noted that like numbered elements depicted in FIG. 5 represent identical elements in FIGS. 1-4.

In MCDN system 500, switching network 140 and access network 130 represent the MCDN client server model, as presented in FIG. 1. Access network 130 is shown coupled to GW 123, representing equipment associated with one of a plurality of MCDN clients (not shown in FIG. 5). Mobile content management server 162, shown coupled to switching network 140, represents one of a number of different MCDN servers that may respectively provide various network services to the plurality of MCDN clients (not shown in FIG. 5).

On the MCDN client side, GW 123 is shown coupled to LAN 424 (see also FIG. 4) for providing connectivity to a number of MCDN terminal devices. In MCDN system 500, LAN 424 is directly coupled to the following representative MCDN terminal devices: MHD with television device 525, gaming console with display 516, and personal computer with display 514. LAN 424 may further be coupled to local wireless router 406, which may provide connectivity to portable media player with display 510 via local wireless network 508, representing another MCDN terminal device accessible by GW 123.

In MCDN system 500, GW 123 may further be coupled to another type of MCDN terminal device, represented by wireless telephone with multimedia display 506. GW 123, through access network 130 and switching network 140, may communicate with mobile content management server 162 for transmitting multimedia content and other information. Mobile content management server 162 may be configured to access mobile network 502, which may be a cellular wide-area network. Mobile network 502 may include wireless network 504, which may be configured to provide wireless network service to a plurality of wireless devices, such as wireless telephone with multimedia display 506. Mobile network 502 may be provided by the same business entity providing MCDN system 500. Alternatively, mobile network 502 may be provided by a different business entity. Although shown as a singular network in FIG. 5, mobile network 502 may schematically represent a number of different wireless networks and/or wireless network providers coupled to mobile content management server 162.

In operation, GW 123 may be configured to transmit, or stream, multimedia content to a number of different kinds of MCDN terminal devices, including MHD with television device 525, gaming console with display 516, personal computer with display 514, portable media player with display 510, and wireless telephone with multimedia display 506. Such MCDN terminal devices may be configured to display the multimedia content. In certain embodiments, a terminal service (not shown in FIG. 5) may execute on the MCDN terminal device for receiving and displaying the multimedia content.

GW 123 may further be configured to respond to a user request via a second MCDN terminal device to remotely view the displayed multimedia content of a first MCDN terminal device. Such a request may be issued via an RC, such as RC 128 (see FIG. 2). GW 123 may then duplicate the multimedia content from the first MCDN terminal device and display the duplicated multimedia content to the user on the second MCDN terminal device. In certain embodiments, the duplicated multimedia content may include multimedia content streamed to the first MCDN terminal device, along with additional user interface elements displayed on the first MCDN terminal device. The duplicated multimedia content may be displayed on the second MCDN terminal device in the form of high-definition video, standard definition video, or as a picture-in-picture display.

It is noted that GW 123 may transcode the duplicated multimedia content to a format suitable for the second MCDN terminal device. For example, a video format for the first MCDN terminal device may not correspond to a video format for the second MCDN terminal device. It is further noted that certain DRM issues may restrict the duplication of the multimedia content displayed on the first MCDN terminal device. In certain embodiments, GW 123 may be configured to obtain DRM authorization for the duplicated multimedia content. The remote viewing functionality described above may be implemented in GW 123, for example by remote viewing 418, in conjunction with remote viewer application 152, using CPE 422 provided within the scope of services of an MCDN client account.

Figure 6:
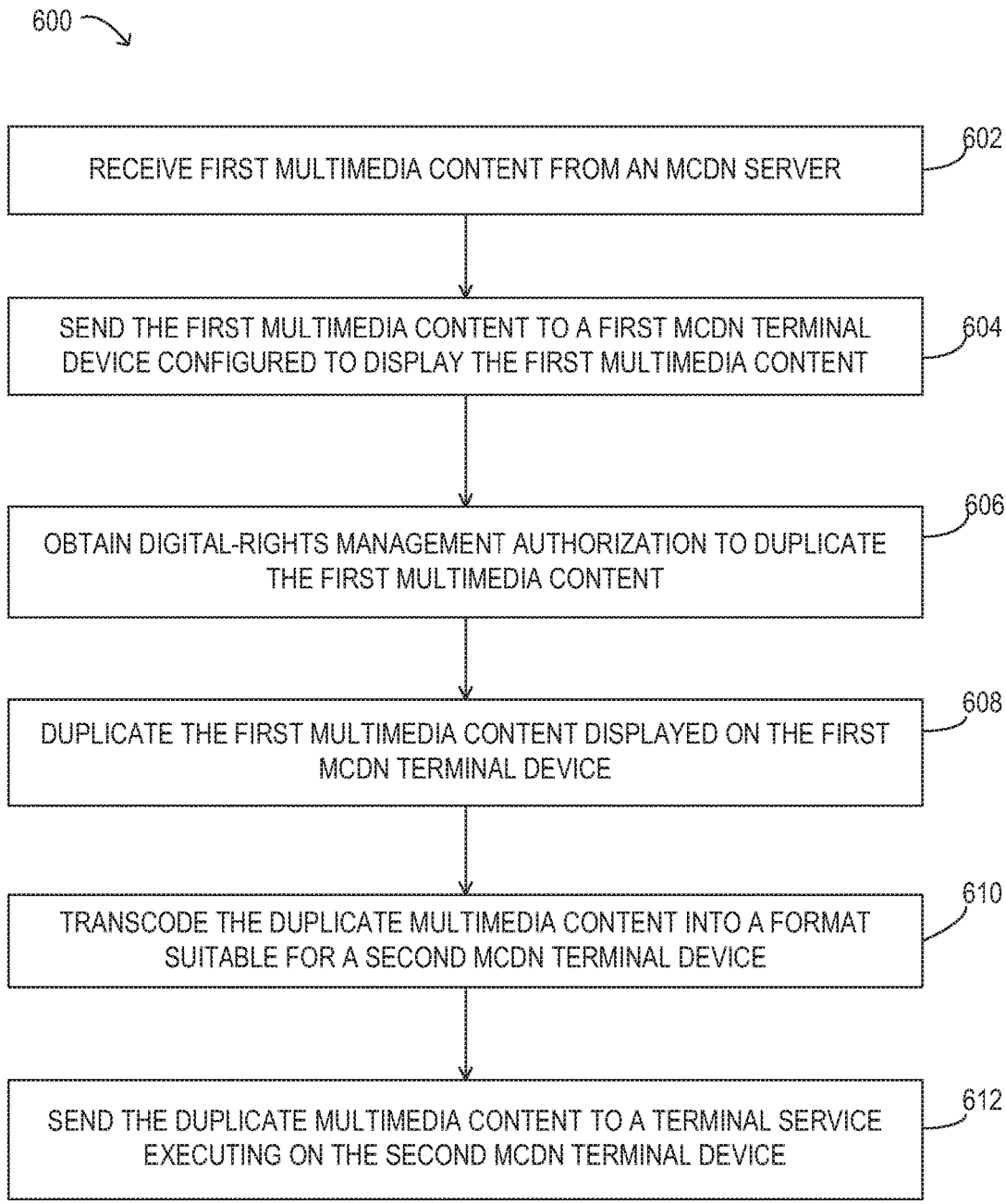
FIG. 6 is a flow chart illustrating selected elements of an embodiment of a method for remove viewing.

Turning now to FIG. 6, an embodiment of method 600 for remote viewing is presented in flow chart form. It is noted that method 600 may be executed by remote viewing 418 and/or remote viewer application 152 (see FIGS. 1, 4). In some embodiments, method 600 may further be executed, at least in part, by MHD 125 (see FIGS. 2-4). It is further noted that operations in method 600 may be rearranged or omitted, as desired.

First multimedia content may be received from an MCDN server (operation 602). The first multimedia content may be sent to a first MCDN terminal device configured to display the first multimedia content (operation 604). DRM authorization to duplicate the first multimedia content may be obtained (operation 606). In certain embodiments DRM authorization may be obtained from an external source. The first multimedia content displayed on the first MCDN terminal device may be duplicated (operation 608). The duplicate multimedia content may be transcoded into a format suitable for a second MCDN terminal device (operation 610). The duplicate multimedia content may be sent to a terminal service executing on the second MCDN terminal device (operation 612). The terminal service may receive and cause the duplicate multimedia content to be displayed on the second MCDN terminal device.

Figure 7:
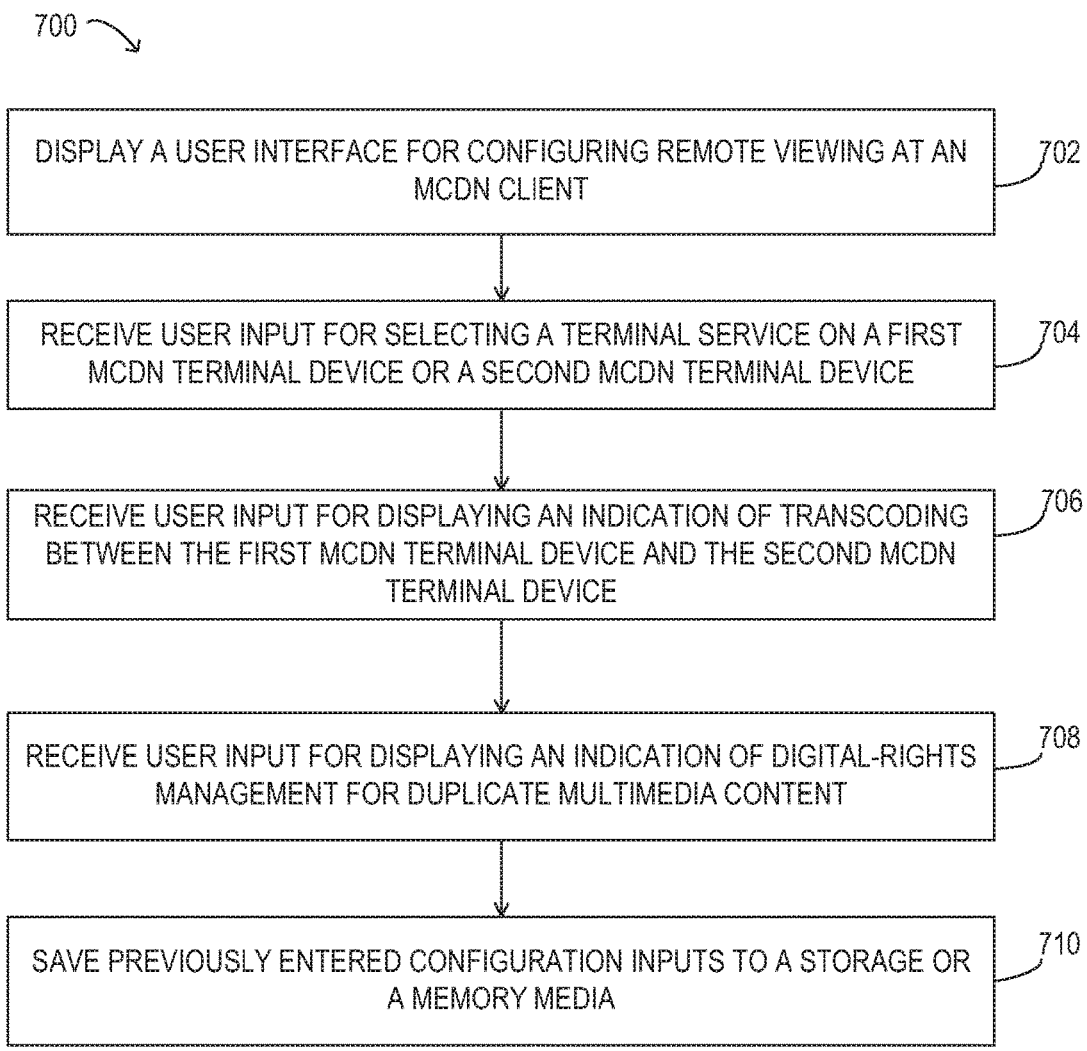
FIG. 7 is a flow chart illustrating selected elements of an embodiment of a method for remote viewing.

Turning now to FIG. 7, an embodiment of method 700 for remote viewing is presented in flow chart form. It is noted that method 700 may be executed by remote viewing 418 and/or remote viewer application 152 (see FIGS. 1, 4). In some embodiments, method 700 may further be executed, at least in part, by MHD 125 (see FIGS. 2-4), for example by EPG 318. It is further noted that operations in method 700 may be rearranged or omitted, as desired.

A user interface for configuring remote viewing at an MCDN client may be displayed (operation 702). User input for selecting a terminal service on a first MCDN terminal device or a second MCDN terminal device may be received (operation 704). User input for displaying an indication of transcoding between the first MCDN terminal device and the second MCDN terminal device may be received (operation 706). User input for displaying an indication of DRM for duplicate multimedia content may be received (operation 708). It is noted that in certain instances, the indication may result in the duplicate multimedia content not being displayed. Previously entered configuration inputs may be saved to a storage or a memory media (operation 710). The previously entered configuration inputs may include the user input received in operations 704-708.

Figure 8:
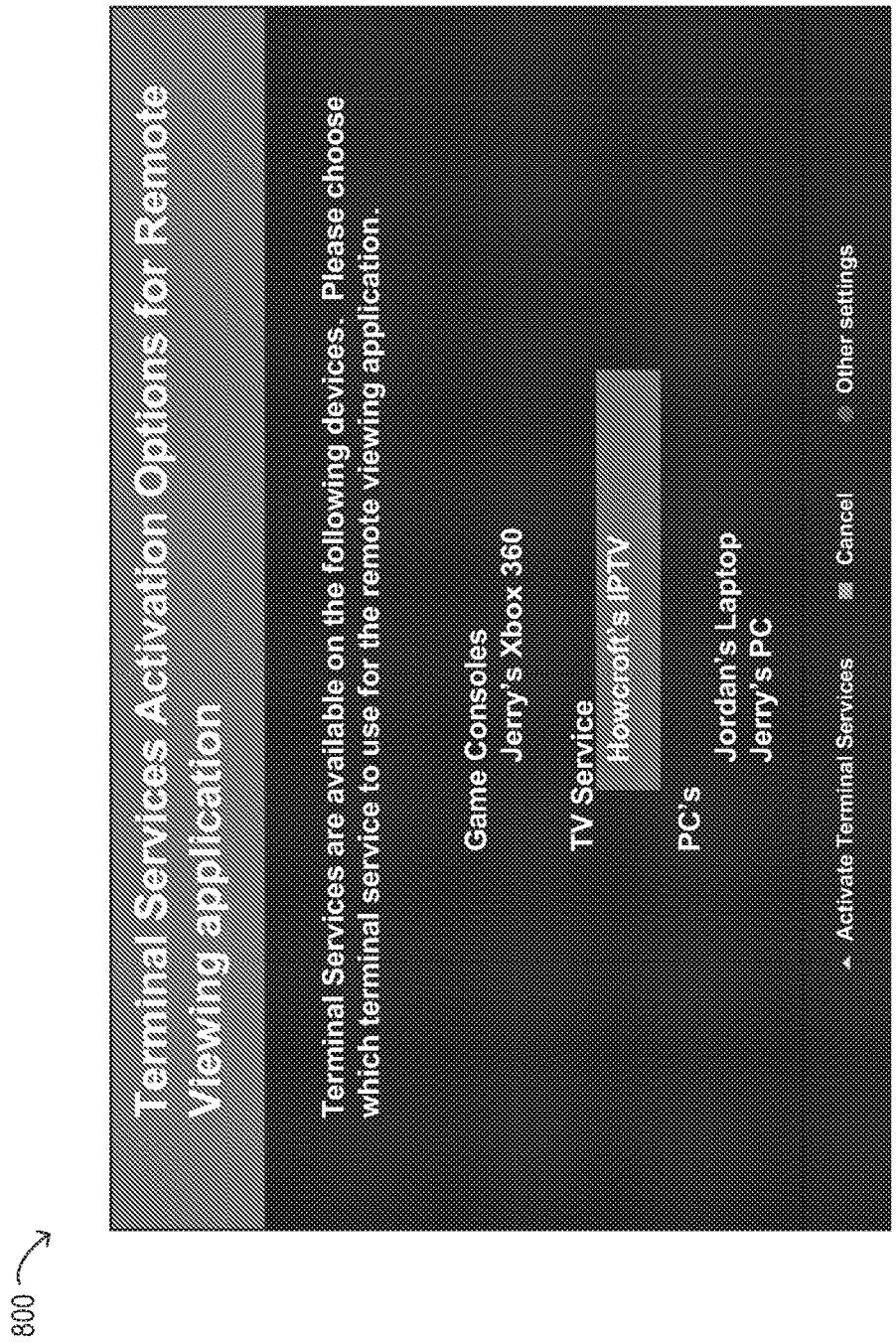
FIG. 8 is a user interface illustrating selected elements of an embodiment of a method for remote viewing.

Turning now to FIG. 8, user interface 800 illustrating selected elements of an embodiment of a method for remote viewing is presented. It is noted that in certain embodiments, user interface 800 may be provided by EPG 318 in conjunction with remote viewer application 152 (see FIGS. 1, 4). User interface 800 shows a display of available MCDN terminal devices at an MCDN client premises for remote viewing. The availability of remote viewing is indicated in user interface 800 by the availability of Terminal Services on individual MCDN terminal devices. User interface 800 further depicts an option to activate individual terminal services on the listed MCDN terminal devices by providing the corresponding user input.

Figure 9:
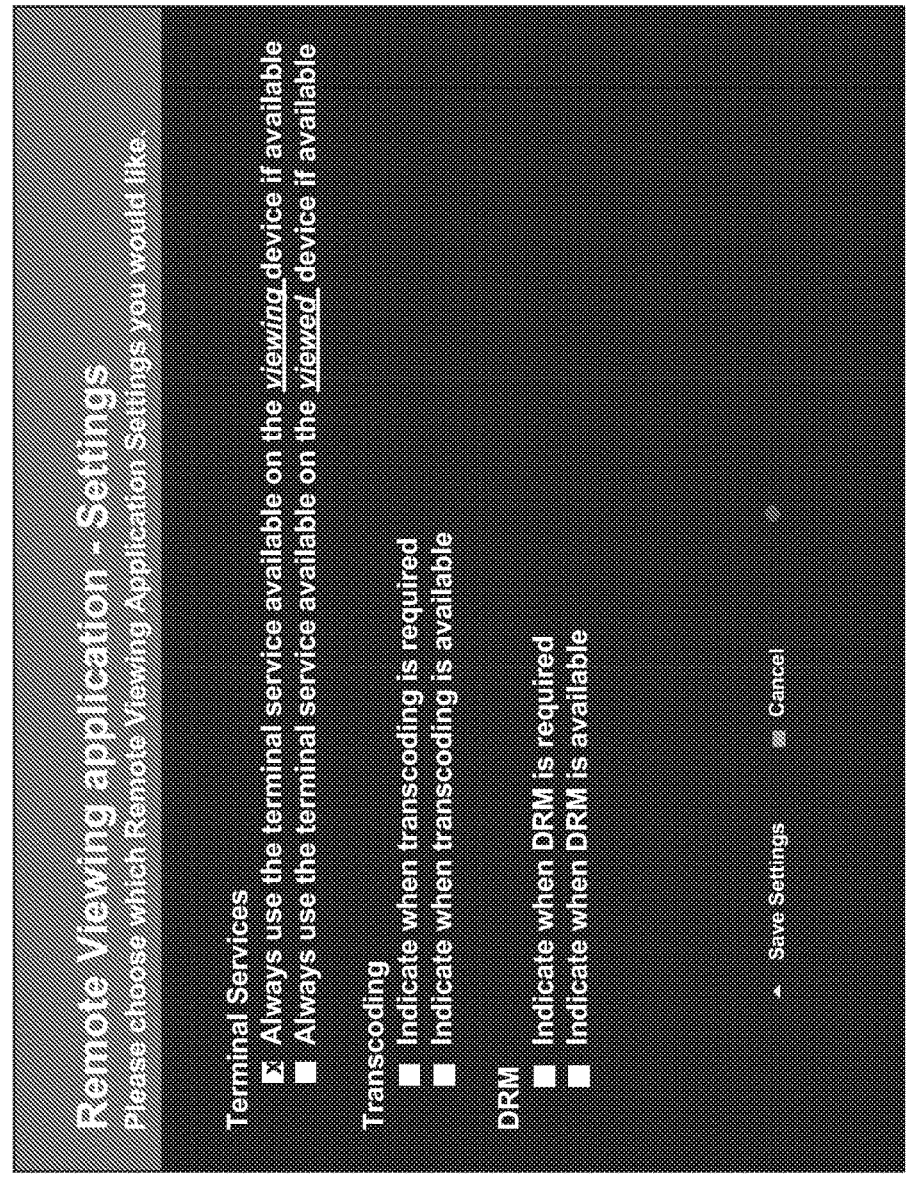
FIG. 9 is a user interface illustrating selected elements of an embodiment of a method for remote viewing.

Referring now to FIG. 9, user interface 900 illustrating selected elements of an embodiment of a method for remote viewing is presented. It is noted that in certain embodiments, user interface 900 may be provided by EPG 318 in conjunction with remote viewer application 152 (see FIGS. 1, 4). User interface 900 may accept user input for configuration of terminal services, transcoding, and DRM. User input for selecting the terminal services on the viewing or viewed MCDN terminal device may be provided in user interface 900. User input for selecting activation of an indication for when transcoding is required and/or available may be provided in user interface 900. User input for selecting activation of an indication for when DRM is required and/or available may be provided in user interface 900. The entered user input may be saved to a storage or memory media in user interface 900.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A method comprising:
    receiving, by a system including a processor, a remote viewing request to view a program on a second terminal device, wherein the program was included in a first multimedia stream that was transmitted, via a service provider network, to a first terminal device of a network client;
    responsive to determining that terminal services are resident on a default device, invoking, by the system, the terminal services of the default device to perform terminal service operations fulfilling the remote viewing request; and
    responsive to determining that the terminal services are not resident on the default device, invoking, by the system, the terminal services of a non-default device to perform the terminal service operations,
    wherein remote viewing configuration information indicates either: a viewed device is the default device and a viewing device is the non-default device; or the viewed device is the non-default device and the viewing device is the default device,
    wherein the terminal service operations include providing a second multimedia stream to the second terminal device, and
    wherein the second multimedia stream is generated by adjusting a format of the first multimedia stream.

2. The method of claim 1, wherein the second multimedia stream is based on a transcoding of the first multimedia stream into the format that is determined to be suitable for the second terminal device.

3. The method of claim 1, further comprising obtaining digital-rights management authorization to generate the second multimedia stream.

4. The method of claim 1, further comprising generating a first user interface identifying all terminal devices supporting the terminal services.

5. The method of claim 4, further comprising generating a second user interface for selecting the remote viewing configuration information.

6. The method of claim 1, wherein the first terminal device and the second terminal device are of device types selected from: a television, a personal computer, a gaming console, and a mobile multimedia device.

7. The method of claim 6, wherein the device type of the first terminal device and the device type of the second terminal device differ.

8. The method of claim 6, wherein the second terminal device comprises a mobile multimedia device supporting wireless telephony communication.

9. A terminal device, comprising:
    a processor;
    a non-transitory computer readable medium, accessible to the processor, including processor executable program instructions which, when executed by the processor cause the processor to perform operations comprising:
    responsive to detecting a remote viewer request associated with a first multimedia stream, performing remote viewing operations comprising accessing remote viewing configuration information indicating one of: a viewed device and a viewing device as a default device, wherein the first multimedia stream is transmitted from a gateway coupled to a server of a service provider network; and
    responsive to determining that the terminal device is the default device and that terminal services are resident on the default device: generating a second multimedia stream by adjusting a format of the first multimedia stream and sending the second multimedia stream to a remote device.

10. The terminal device of claim 9, wherein the terminal device comprises a set top box, wherein a device type of the remote device is a wireless telephone.

11. The terminal device of claim 10, wherein the second multimedia stream is a duplicate of the first multimedia stream.

12. The terminal device of claim 11, wherein the wireless telephone is configured to receive and display streaming multimedia content.

13. The terminal device of claim 9, wherein the terminal device and the remote device are coupled to the gateway via a fixed network.

14. The terminal device of claim 9, further comprising:
    a local wireless network adapter configured to provide wireless access to at least one of the terminal device and the remote device.

15. A server, comprising:
    a processor; and
    a non-transitory computer readable medium, accessible to the processor, including processor executable program instructions which, when executed by the processor cause the processor to perform operations comprising:
    receiving a remote viewing request from a communication device;
    accessing remote viewing configuration information indicating one of: a viewed device and a viewing device as a default device; and
    responsive to determining that terminal services are resident on the default device, invoking the terminal services of the default device to perform terminal service operations comprising: generating a second multimedia stream by adjusting a format of a first multimedia stream and providing the second multimedia stream to the communication device, wherein the first multimedia stream is transmitted, via a service provider network, to a first terminal device of a network client.

16. The server of claim 15, wherein the second multimedia stream is generated by transcoding the first multimedia stream into the format that is determined to be suitable for the communication device.

17. The server of claim 15, wherein the operations further comprise receiving information prompting user input to indicate either the viewed device or the viewing device as the default device.

18. The server of claim 15, wherein the operations further comprise generating a first user interface requesting identification of terminal devices supporting terminal services.

19. The server of claim 18, wherein the operations further comprise generating a second user interface for indicating the remote viewing configuration information.

20. The server of claim 15, wherein the first terminal device is a device selected from: a television, a personal computer, a gaming console, and a mobile multimedia device.

\* \* \* \* \*